Patented July 3, 1934

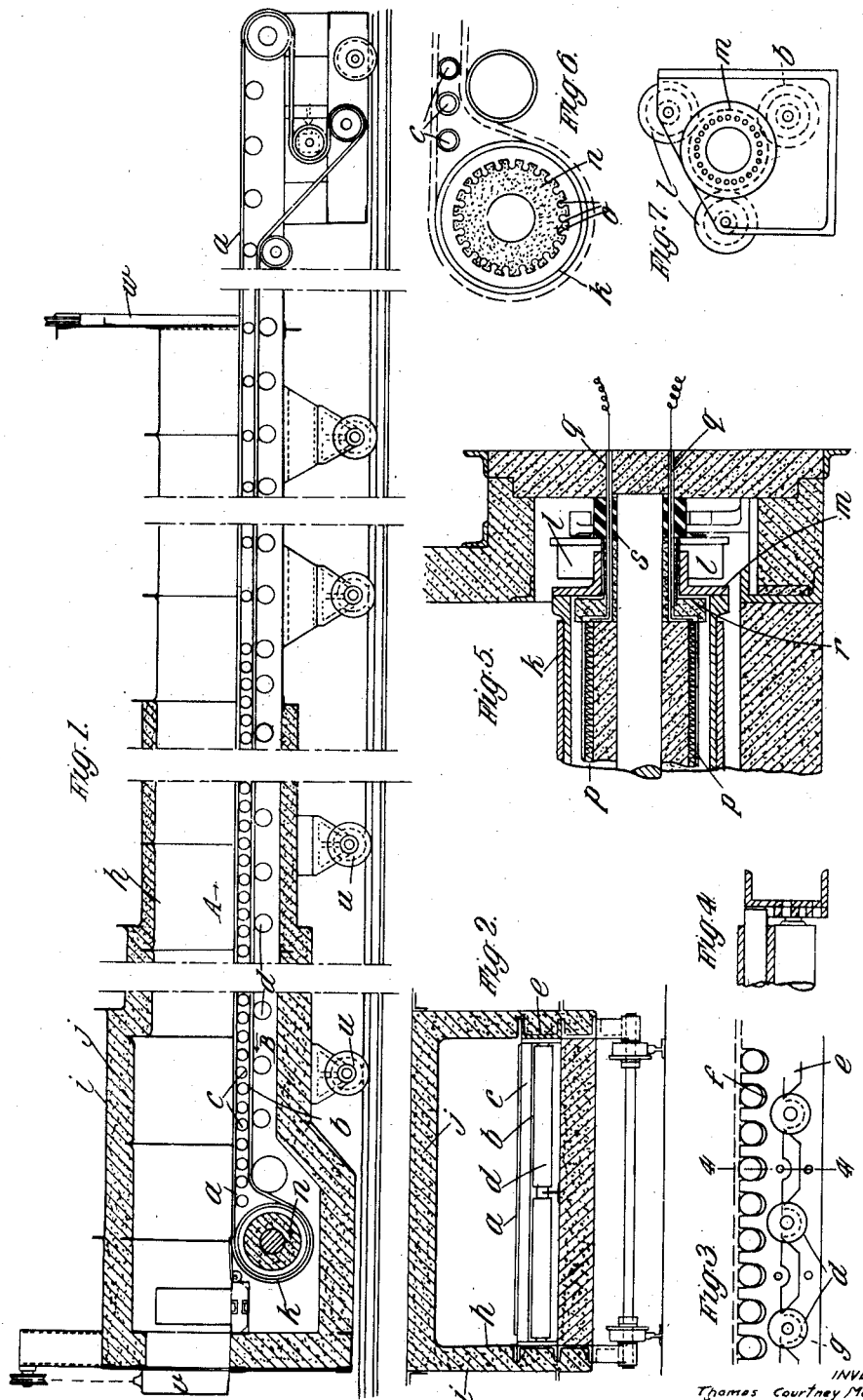

1,965,350

UNITED STATES PATENT OFFICE

1,965,350

LEER, ANNEALING FURNACE, OR LIKE APPARATUS

Thomas Courtney Moorshead and Francis Augustus Hurlbut, Strand, England, assignors to The United Glass Bottle Manufacturers Limited, Strand, England, a British company Application July 23, 1929, Serial No. 380,335
In Great Britain November 2, 1928

21 Claims. (Cl. 49—47)

This invention relates to leers, annealing furnaces or the like of the type in which the glass or other articles to be treated are caused to travel therethrough on an endless conveyor. In apparatus of this type it is usual to heat that part of the conveyor belt which is adjacent the point where the articles enter the leer to a temperature corresponding approximately to the temperature of the entering articles themselves and the chief object of the present invention is the provision of improvements in the mode of utilizing the heat in, and of applying heat to, the conveyor belt.

According to one feature of the invention the return or lower portion of the conveyor belt is caused to travel in close proximity to the upper or outgoing portion thereof and a series of rollers are interposed between the two portions of the conveyor belt so that they extend transversely of the latter and are free to rotate about their longitudinal axes. The conveyor belt may be composed of woven wire or other suitable material, and the rollers may be arranged so that they are supported by the upper surface of the return portion of the conveyor belt with their uppermost parts bearing against, and forming a support for, the upper or outgoing portion of the conveyor belt. By this arrangement, friction is reduced to a minimum and the heating of the return portion of the conveyor is facilitated, since heat may be readily transferred thereto from the upper or outgoing portion of the conveyor by radiation and convection and by conduction through the rollers. Preferably the ends of the rollers are accommodated in a series of vertical slots formed in a pair of side frame members so that the rollers are "floating" or free to rise and fall. The lower surface of the return portion of the conveyor belt may be supported by a plurality of supporting rollers journalled in bearings which may be carried by, or formed in, the side frame members.

According to a further feature of the invention heat is applied to the conveyor belt by causing the latter to pass around a heated drum located adjacent the point where the articles enter the leer. The drum may be made hollow and gas, oil, steam or other suitable heating medium passed therethrough, or it may be equipped with electrical heating means. For instance, the drum may be formed so that it is rotatable around a stationary armature or core constructed of fireclay or other suitable material and formed with a series of slots accommodating a series of electrical heating elements or coils, the ends of which are connected to suitably arranged terminals for enabling the elements to be connected to a source of electric supply. A suitable switch may be provided for enabling one or more of the heating elements to be cut out of circuit when desired.

In order that the said invention may be clearly understood and readily carried into effect the same will now be described with reference to the accompanying drawing, in which:—

Figure 1 is a longitudinal section through one form of leer constructed in accordance with the invention, Figure 2 is a transverse section through the leer illustrated in Figure 1, Figure 3 is a fragmentary detail view illustrating the manner in which the "floating" and supporting rollers are carried by the side frame members, Figure 4 is a section on line 4—4 of Figure 3, Figure 5 is a longitudinal section through the bearing of the conveyor heating drum, Figure 6 is a transverse section through the conveyor heating drum, and Figure 7 is a detail view illustrating the manner in which the conveyor drum is supported.

In Figures 1 and 2 $a$ is the outgoing portion of the conveyor belt and $b$ is the return portion thereof. $c$ are the floating rollers which form a support for the outgoing portion of the conveyor belt, and are in turn, supported by the return portion of the conveyor belt so that they extend transversely of the latter. $d$ are the supporting rollers by which the return portion of the conveyor belt is carried. $e$ are the side frame members which are formed with a series of vertical slots $f$, as shown in Figures 3 and 4, for accommodating the ends of the floating rollers, the supporting rollers $d$ being journalled in fixed bearings $g$ which are carried by the side frame members. The side frame members $e$ are suitably secured to, or in, the side walls of the leer which may be of the non-insulated type or of the insulated type shown in which the leer tunnel consists of an inner casing $h$ and an outer casing $i$ between which is packed insulating material $j$ to prevent loss of heat by radiation. $k$ is the heating drum which is located adjacent the point where the articles enter the leer and around which the conveyor belt is caused to pass. The drum is supported by three equally spaced flanged rollers $l$ (as shown in Figures 5 and 7) arranged at each end of the drum so that they bear against a pair of flanged end plates $m$ which are secured to the ends of the drum. $n$ is the stationary armature or core (see particularly Figure 6) around which the drum is adapted to be rotated by the pull of the conveyor belt and $o$ are the slots which are formed in the periphery of the core for the accommodation of the electric heating coils p the ends of which are connected to leads q. The leads pass through holes formed in the end of the core, then through an insulated end plate r, then through an insulated bracket s and finally through an insulated cover plate t to the outside of the leer to permit the coils to be connected to a suitable source of electric current. The leads are preferably connected to a suitable switch gear (not shown) arranged so that any coil or number of coils may be cut out as required. By this arrangement the heat generated in the heating coils is radiated to the heating drum which, in turn, transfer heat to the conveyor belt and the amount of heat supplied may be regulated so as to compensate for any difference in temperature at the forward end of the leer between the return and outgoing portions of the conveyor belt. The entire leer may be made portable by mounting the same on rollers u as shown so that it may be transported from one place to another without dismantling and suitable lifting doors v and w are arranged at each end of the leer tunnel to prevent loss of heat or cold air currents entering the leer.

The operation of the leer is as follows:—When starting from a cold state, an electric current is passed through the heating coils p until the conveyor belt is raised to the desired temperature. The conveyor belt is then set in motion, the direction of movement of the outgoing and return portions of the belt being indicated by the arrows A and B, respectively, shown in Figure 1, so that heat is conveyed down the leer and transferred to the return portion of the conveyor belt as above described, the leer walls also becoming heated by radiation and convection from the travelling conveyor. When the leer has become heated to the desired temperature the articles to be annealed are placed on the forward end of the outgoing portion of the conveyor belt, the said articles being themselves at a temperature which is equal to or above that of the conveyor belt. Should the temperature in the leer rise above that required for annealing, certain of the heating coils are cut out so that the quantity of heat supplied is restricted to a value sufficient to make up any loss due to radiation or other causes. Owing to the non-conductive construction of the walls, roof and bottom of the leer, the heat contained in the articles themselves will normally be sufficient for annealing purposes once the leer has been heated up.

What we claim and desire to secure by Letters Patent of the United States is: —

1. A leer comprising an endless conveyor belt the return portion of which is caused to travel in close proximity to the outgoing portion thereof, a series of rollers interposed between the two portions of the conveyor belt so that they extend transversely of the latter, the said rollers being supported by the upper surface of the return portion of the conveyor belt.

2. A leer comprising a pair of side frame members having a series of rollers journalled therein and formed with a series of vertical slots, an endless conveyor belt the return portion of which is supported by the said rollers and the outgoing portion of which is supported by other rollers which are supported by the upper surface of the return portion of the conveyor belt and the ends of which are accommodated in the vertical slots.

3. A leer comprising a leer tunnel, an endless conveyor belt having outgoing and return portions thereof located within the tunnel and in close proximity to each other, and a series of rollers located within the tunnel between and in contact with both the outgoing and return portions of the conveyor belt transversely thereof.

4. A leer comprising an endless conveyor belt the return portion of which is caused to travel in close proximity to the outgoing portion thereof, and a series of rollers interposed between the two portions of the conveyor belt transversely thereof, the said rollers being free to rise and fall to a limited extent.

5. A leer comprising a leer tunnel, an endless conveyor belt having outgoing and return portions thereof located in close proximity to each other within the tunnel, a pair of side frame members having a series of vertical slots therein, a series of rollers located within the tunnel between and in contact with both the outgoing and return portions of the conveyor belt and supported by the return portion and supporting the outgoing portion and having their ends accommodated in said slots, a second series of rollers journalled in said members and supporting the return portion of the conveyor belt, a rotatable drum around which the conveyor belt passes, a stationary armature located within the drum and equipped with a series of electrical heating elements, and a switch enabling certain of the heating elements to be cut out of circuit.

6. A leer comprising an endless conveyor belt the return portion of which is caused to travel in close proximity to the outgoing portion thereof and a series of rollers interposed between the two portions of the conveyor belt so that they extend transversely thereof and contact with both said portions so that heat is conducted by the rollers from the outgoing to the return portion of the conveyor belt.

7. A leer comprising a tunnel, an endless conveyor belt, having outgoing and return portions thereof located within the tunnel and in close proximity to each other, a series of rollers located within the tunnel between and in contact with both outgoing and return portions of the conveyor belt, transversely thereof, so that heat by conduction can be passed from the outgoing to the return portion of said conveyor belt.

8. A leer, comprising a leer tunnel, an endless conveyor belt having outgoing and return portions thereof located within the tunnel in close proximity to each other, and a series of rollers located within the tunnel and between the outgoing and return portions of the conveyor belt transversely thereof, the outgoing and return portions of the conveyor belt within the tunnel being separated only by said rollers.

9. A leer, comprising a leer tunnel, an endless conveyor belt having outgoing and return portions thereof located within the tunnel in close proximity to each other, a series of rollers located within the tunnel and between the outgoing and return portions of the conveyor belt transversely thereof, the outgoing and return portions of the conveyor belt within the tunnel being separated only by said rollers, a drum located adjacent to the entrance of the tunnel around which drum the conveyor belt passes, and drum heating means located within the drum.

10. A leer, comprising a leer tunnel, an endless conveyor belt having outgoing and return portions thereof located within the tunnel and in close proximity to each other, a series of rollers located within the tunnel and in contact with both the outgoing and return portions of the conveyor belt transversely thereof, a drum located adjacent to the entrance to the tunnel, the conveyor belt passing around said drum, and heating means located within the drum.

11. A leer, comprising a leer tunnel, an endless conveyor belt having outgoing and return portions thereof located within the tunnel and in close proximity to each other, a series of rollers located within the tunnel between and in contact with both the outgoing and return portions of the conveyor belt transversely thereof, a drum located adjacent to the entrance to the tunnel, the conveyor belt passing around said drum, and a stationary armature equipped with electrical means located within the drum.

12. A leer, comprising a leer tunnel, an endless conveyor belt having outgoing and return portions thereof located within the tunnel and in close proximity to each other, a series of rollers located within the tunnel between and in contact with both the outgoing and return portions of the conveyor belt transversely thereof, a drum located adjacent to the entrance to the tunnel, the conveyor belt passing around said drum, a stationary armature equipped with electrical heating elements located within the drum, and a switch for cutting certain of the heating elements out of circuit.

13. A leer comprising an endless conveyor belt the return portion of which is caused to travel in close proximity to the outgoing portion thereof, and a series of heat transferring elements contacting with a horizontal surface of the outgoing portion and with a horizontal surface of the return portion of the conveyor belt so as to transfer heat from the outgoing portion to the return portion.

14. A leer comprising a leer tunnel, an endless conveyor belt having outgoing and return portions thereof located within the tunnel in close proximity to each other, and a series of heat transferring devices located within the tunnel and contacting with a horizontal surface of the outgoing portion and with a horizontal surface of the return portion of the conveyor belt so as to transfer heat from the outgoing portion to the return portion.

15. A leer comprising a leer tunnel, an endless conveyor belt having outgoing and return portions thereof located within the tunnel in close proximity to each other, a series of heat transferring devices located within the tunnel and contacting with a horizontal surface of the outgoing portion and with a horizontal surface of the return portion of the conveyor belt so as to transfer heat from the outgoing portion to the return portion, a drum located adjacent to the entrance to the tunnel around which drum the conveyor belt passes, and drum heating means located within the drum.

16. A leer comprising a leer tunnel, an endless conveyor belt having outgoing and return portions thereof located within the tunnel in close proximity to each other, a series of heat transferring devices located within the tunnel and contacting with a horizontal surface of the outgoing portion and with a horizontal surface of the return portion of the conveyor belt so as to transfer heat from the outgoing portion to the return portion, a drum located at the entrance of the leer tunnel around which drum the conveyor belt passes, a stationary armature around which said drum rotates, and electrical heating means carried by the armature within the drum.

17. A leer comprising a leer tunnel, an endless conveyor belt having outgoing and return portions thereof located within the tunnel in close proximity to each other, and means located within the leer tunnel in contact with a horizontal surface of the outgoing portion and with a horizontal surface of the return portion of the conveyor belt so as to conduct heat from the outgoing portion to the return portion.

18. A leer comprising an endless conveyor belt the return portion of which is caused to travel in close proximity to the outgoing portion thereof, and a series of heat transferring devices contacting with a horizontal surface of the outgoing portion and with a horizontal surface of the return portion of the conveyor belt so as to transfer heat from the outgoing portion to the return portion, said portions being separated only by said devices thereby permitting a ready transfer of heat by radiation from the outgoing portion to the return portion between said elements.

19. A leer comprising a leer tunnel, an endless conveyor belt having outgoing and return portions thereof located within the tunnel in close proximity to each other, means located within the leer tunnel and supporting the outgoing portion of the conveyor belt and being supported by the return portion of the conveyor belt so as to contact with both the outgoing and return portions to transfer heat from the outgoing portion to the return portion.

20. A leer comprising an endless conveyor belt the return portion of which is caused to travel in close proximity to the outgoing portion thereof, a series of heat transferring devices supporting the outgoing portion and being supported by the return portion of the conveyor belt so as to contact with both portions and to transfer heat from the outgoing portion to the return portion.

21. A leer comprising a leer tunnel, an endless conveyor belt having outgoing and return portions thereof located within the tunnel in close proximity to each other, a series of narrow spaced heat transferring devices located within the tunnel and contacting with a horizontal surface of the outgoing portion and with a horizontal surface of the return portion of the conveyor belt so as to effect transfer of heat from the outgoing portion to the return portion and so as to permit transference of heat by radiation between said devices.

THOMAS COURTNEY MOORSHEAD.
FRANCIS AUGUSTUS HURLBUT.